July 20, 1965  R. P. TOLLAR  3,195,840
AIRCRAFT LANDING GEAR
Filed Oct. 10, 1963  2 Sheets-Sheet 1
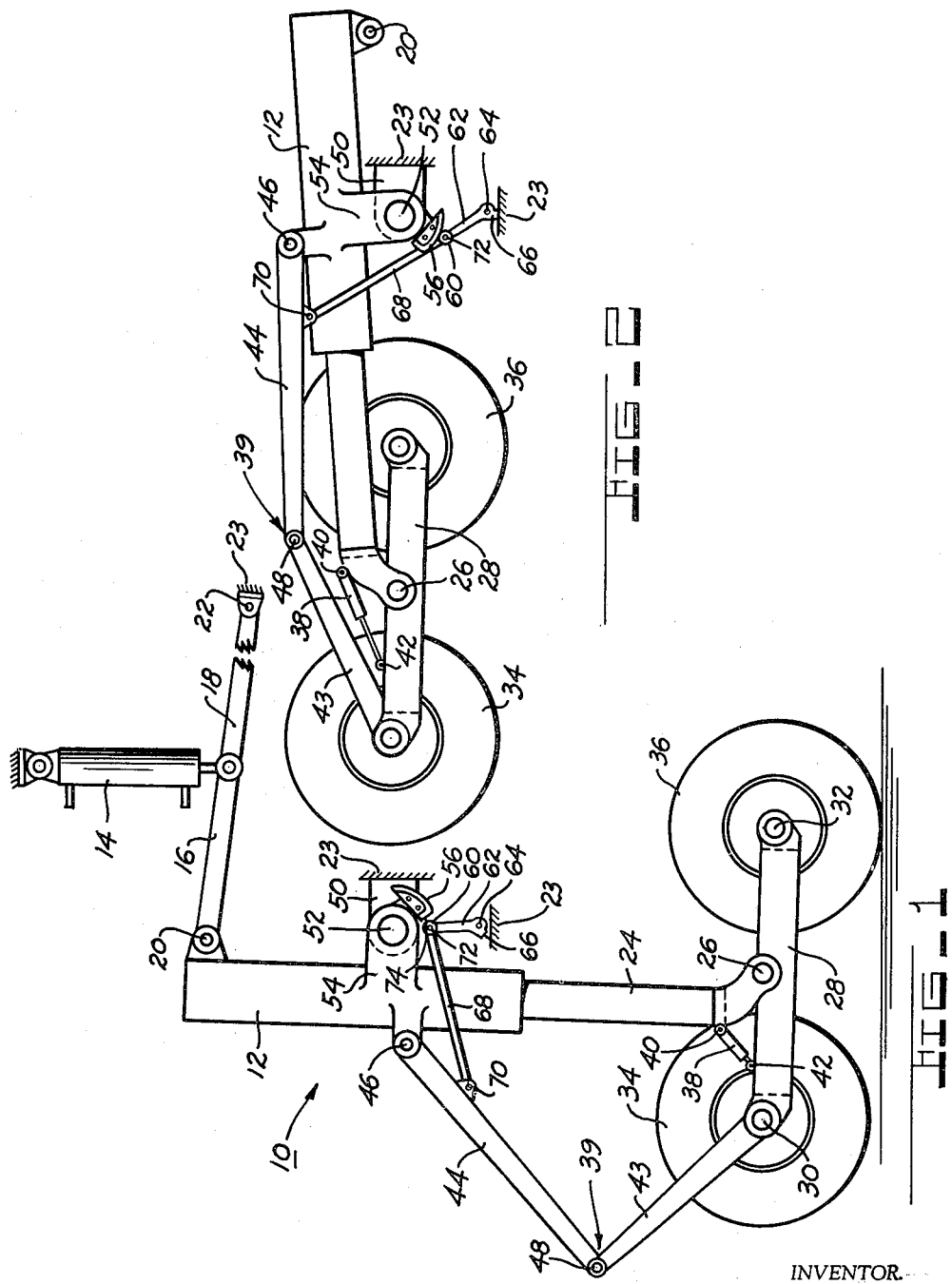
INVENTOR.
RAYMOND P. TOLLAR.
BY
ATTORNEY.

July 20, 1965                R. P. TOLLAR                3,195,840
                          AIRCRAFT LANDING GEAR
Filed Oct. 10, 1963                                2 Sheets-Sheet 2
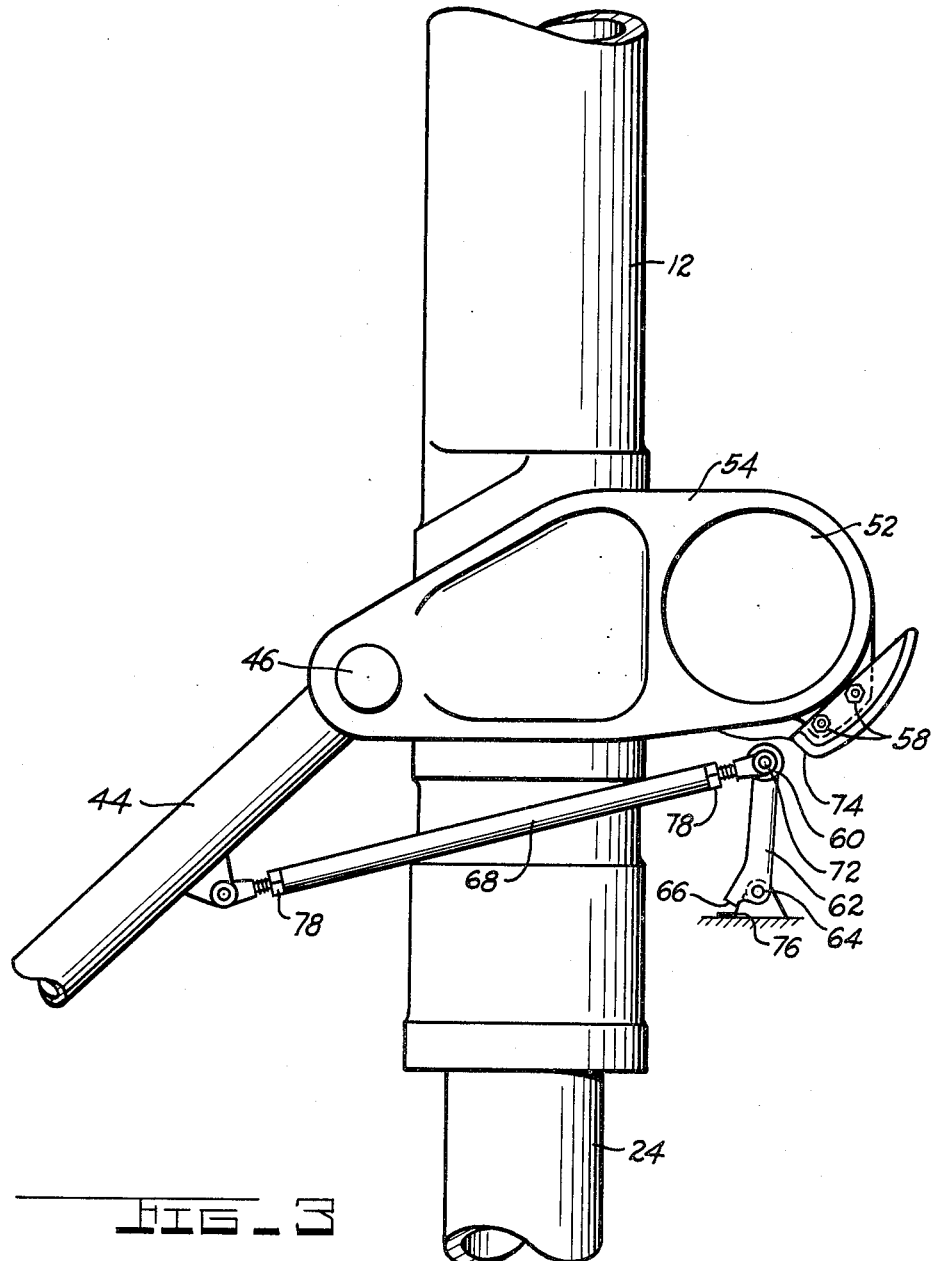
FIG_3
INVENTOR.
RAYMOND P. TOLLAR.
BY
ATTORNEY.

3,195,840
AIRCRAFT LANDING GEAR
Raymond P. Tollar, South Bend, Ind., assignor to The Bendix Corporation, South Bend, Ind., a corporation of Delaware
Filed Oct. 10, 1963, Ser. No. 315,192
5 Claims. (Cl. 244—102)

This invention relates to an aircraft landing gear and in particular to an aircraft landing gear of the bogie wheel type.

In conventional landing gears, it is customary to retract the shock strut by rotating it around the horizontal axis. The retraction is normally accomplished by connecting a retraction actuator between the aircraft frame and the shock strut. The use of such conventional retraction mechanisms has previously been thought to be undesirable in aircraft wherein the landing gear must be retracted and stored in/or adjacent to the fuselage. However, it is the principal intent of my invention to provide a landing gear which is retractable into an external blister or similar compartment provided for reception thereof.

It is also an object of my invention to provide means for rendering the landing gear frontal area at a minimum during the retraction thereof to reduce the effect of drag forces thereon.

It is more particularly an object of my invention to provide a means for holding a bogie type landing gear arrangement in a level attitude during its retraction into an appropriate compartment of an aircraft.

Even more particularly, it is an object of my invention to provide a cam and cam following means for holding a landing gear in a level attitude during retraction thereof and permitting the landing gear to have the proper ground contact angle upon extension thereof prior to landing.

Further objects and advantages will appear from the following description and drawings wherein:

FIGURE 1 is a detailed drawing of a landing gear having incorporated the principles of my invention, which landing gear is shown in fully extended condition prior to ground contact;

FIGURE 2 is a detail drawing of the landing gear of FIGURE 1 in a retracted attitude; and FIGURE 3 is an enlarged detail drawing of the cam mechanism in accordance with my invention for maintaining the level and inclined attitudes during retraction and complete extension, respectively.

As I have previously stated, it is the prime purpose of my invention to provide a landing gear 10 having a shock strut 12 positioned by an actuator 14 adapted to collapse the links 16 and 18 of a drag strut pivotally connected, as at 20, to the shock strut and, as at 22, to the aircraft structure 23. The shock strut 12 is of familiar type having a telescoping member 24 provided with a pivot pin 26 at its lower end that connects a bogie beam or frame 28 thereto. The bogie frame 28, in turn, mounts a pair of axles 30 and 32 at each end on which a pair of wheels 34 and 36 are rotatably mounted. In addition, a spring or liquid bungee 38 is pivotally connected, as at 40, to the telescoping member 24 and, as at 42, to the bogie frame behind the front axle 30.

In order to prevent rotation of member 24 with respect to the shock absorber 12, I incorporate a scissors link 39 having leg portions 40 and 43 connecting the bogie beam 28 to the shock strut 12, as at pivot point 46. This scissors link is pivotally connected to the axle 30 of the bogie beam 28 and has a medial pivotal connection to each other, as at 48. The shock strut 12 is pivotally mounted to a bracket 50, as at 52, which bracket 50 is affixed to the aircraft structure 23. A lug or bracket 54, welded or otherwise affixed to the shock strut 12, provides the means for connection of the shock strut to the bracket 50, aforementioned. In addition, the lug 54 carries a cam 56 that is bolted thereto, as by a pair of bolts 58 (see FIGURE 3). The cam 56 is arranged to rotate with the shock strut 12 and in so doing is adapted to contact a cam follower 60 mounted atop an arm 62 pivoted as at 64 to aircraft structure. The arm 62 is also provided with a stop 66 that is arranged to contact the aircraft structure 23 on pivoting in a counterclockwise direction. In addition, a connecting rod 68 is pivotally connected as at 70 to the upper link 44 of the scissors link arrangement and to the cam follower 56, as at 72. As seen in FIGURE 1, the cam follower in the normal position lies adjacent but minutely spaced from a forward vertical face 74 of the cam 56. If need be, as seen in FIGURE 3, a shim 76 may be affixed to the aircraft structure to further limit the pivotal motion of the arm 62 toward the aircraft structure. In addition, the connecting rod 68 may be of familiar construction having adjustable ends 78 to allow adaptability to the installation.

In operation, as the landing gear retracts, cam 56 engages the cam follower or roller 60 which is attached to the arm 62. This will rotate the arm 62 about the pivot 64 to a position shown where the stop surface 66 is abutting the surrounding aircraft surface, as seen in FIGURE 2. The arm 64 is then held in this position by the roller or cam follower 60 on the surface of the cam 56 during the remainder of the retraction cycle, thus, making the attitude of the arm and cam follower shown by FIGURE 2 a fixed location relative to the aircraft structure. Thus, the connecting or radius rod 68 connected to the arm 62 adjacent the roller 60 controls the position of the bogie or axle beam 28 by controlling the relative position of the scissor links 43 and 44 with respect to the landing gear. The bogie beam 28 is thus positioned and held in the desired attitude with landing gear retracted. During normal landing, take-off, and taxi operations the landing gear will operate normally. However, prior to landing the spring or liquid bungee 38 is such as to hold the attitude of the rear wheel 36 slightly lower than that of the front wheel 34. As a safety measure, the cam follower 60 will engage the cam 56 at the vertical front face 74 when the gear is in the extended attitude of FIGURE 1, if for some reason the bogie beam 28 should drop a predetermined distance below normal landing attitude, due to failure of the bungee 38. This will prevent the possibility of landing with the forward wheels 34 down beyond a safe position.

As those skilled in the art will readily appreciate, the above description is offered in compliance with the applicable patent statutes and is not limitative of the manner of construction. The true scope of my invention is found in the appended claims.

I claim:
1. In an aircraft an undercarriage comprising:
 a shock absorber with means pivotally mounted to said aircraft;
 a collapsible drag strut means for holding said shock absorber means in a vertical position;
 an actuating device operatively connected to said drag strut and pivotally connected to said aircraft to cause said drag strut to pivot said shock absorber;
 a bogie landing gear pivotally connected to said shock absorber, said gear including a bogie beam adapted to rotatably mount a fore and an aft wheel means;
 a positioning means interconnecting said bogie beam said shock absorber to hold said beam such that said aft wheel means is held lower than said forward wheel means, said positioning means being arranged to allow said beam to pivot to cause said forward wheel and said rear wheel to assume the same attitude after said rear wheel has come into ground contact;

a scissors link attaching the bogie beam adjacent its forward end to said shock absorber adjacent the means pivotally mounting said shock absorber to said aircraft;

a cam attached to said means pivotally mounting said shock absorber to rotate about an axis upon retraction of said shock absorber as by collapsing said drag strut by said actuating device;

a cam follower pivotally mounted to said aircraft, said follower having means permitting limited rotation in one direction and arranged to be impeded in the other direction by a vertical face on said cam; and a connecting rod attached at one end to said cam follower and at the other end to an upper section of said scissors link whereupon said scissors link will be caused to oppose said positioning means as said undercarriage is being retracted.

2. For an aircraft retractable undercarriage including a bogie-type landing gear and a shock absorber having a pivotable connection to said aircraft and adapted to rotatably carry said bogie-type landing gear, a means to maintain a substantially level attitude for said bogie-type landing gear during retraction thereof, said means comprising:

a cam affixed to said shock absorber structure at the pivotal connection with the aircraft;

a scissor link means connecting said bogie-type landing gear to a non movable portion of said shock absorber;

a positioning link means attached to said scissor link means and including a first and second link that are pivotally connected one to the other said first link means being pivotally connected to said scissor link means and said second link means being pivotally connected to said aircraft; and a cam follower affixed to the pivotal connection of said first and second position said first and second links of said position link means and arranged with respect to said cam affixed on the pivotal connection of said shock absorber with the aircraft so as to cooperate with said cam to position said bogie-type landing gear in a substantially level attitude throughout the retraction and extension of said undercarriage.

3. A means to maintain a substantially level attitude for a bogie-type landing gear according to claim 2 wherein said position link means may be characterized as rigid tubular members having appropriate eyelet portions in said first and second links to permit said pivotal connections.

4. A means to maintain a substantially level attitude for a bogie-type landing gear according to claim 2 wherein said first link means of said positioning link means includes an adjustable end means to permit proper adjustment of said positioning link means.

5. A means to maintain a substantially level attitude for a bogie-type landing gear according to claim 2 wherein said cam has a portion thereof for contacting said cam follower when the landing gear is extended to preclude improper positioning of the bogie-type landing gear.

References Cited by the Examiner

UNITED STATES PATENTS

| 2,215,598 | 9/40 | Sznycer | 244—102 |
| 2,755,041 | 7/56 | Lewis | 244—102 |
| 3,083,937 | 4/63 | Bainbridge | 244—102 |

FOREIGN PATENTS

| 651,149 | 3/51 | Great Britain. |
| 820,217 | 9/59 | Great Britain. |

MILTON BUCHLER, *Primary Examiner.*

ANDREW H. FARRELL, *Examiner.*